(12) United States Patent
Umezawa et al.

(10) Patent No.: US 11,701,943 B2
(45) Date of Patent: *Jul. 18, 2023

(54) METHOD OF MANUFACTURING A HOLLOW SPRING MEMBER

(71) Applicant: NHK SPRING CO., LTD., Yokohama (JP)

(72) Inventors: Masahiro Umezawa, Yokohama (JP); Daisuke Takeda, Yokohama (JP)

(73) Assignee: NHK SPRING CO., LTD, Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/696,971

(22) Filed: Mar. 17, 2022

(65) Prior Publication Data

US 2022/0203800 A1 Jun. 30, 2022

Related U.S. Application Data

(60) Division of application No. 16/145,037, filed on Sep. 27, 2018, which is a continuation of application No. PCT/JP2017/013098, filed on Mar. 29, 2017.

(30) Foreign Application Priority Data

Mar. 30, 2016 (JP) ................................ 2016-068043

(51) Int. Cl.
*B60G 21/055* (2006.01)
*B60G 11/14* (2006.01)
(Continued)

(52) U.S. Cl.
CPC ............ *B60G 21/055* (2013.01); *B60G 11/14* (2013.01); *B60G 21/045* (2013.01); *F16F 1/02* (2013.01);
(Continued)

(58) Field of Classification Search
CPC ........ F16F 1/14; F16F 1/06; F16F 2224/0208; F16F 2226/02; F16F 2234/02;
(Continued)

(56) References Cited

U.S. PATENT DOCUMENTS 2,406,059 A  8/1946  Burch
2,408,596 A  10/1946  Bednar et al.
(Continued)

FOREIGN PATENT DOCUMENTS

DE  102011002065 A1  10/2012
EP  2647449 A1  10/2013
(Continued)

OTHER PUBLICATIONS

Office Action (Non-Final Rejection) dated Dec. 7, 2022, issued in related U.S. Appl. No. 17/510,669.
(Continued)

*Primary Examiner* — Xuan Lan Nguyen
(74) *Attorney, Agent, or Firm* — Holtz, Holtz & Volek PC (57) ABSTRACT

A method for manufacturing a hollow spring member having a hollow steel spring rod having terminal sealed portions at both ends thereof. Each terminal sealed portion has a rotationally symmetric shape in which an axis passing through a center of the spring rod is an axis of symmetry. Each terminal sealed portion has an end wall portion including an end face; an arc-shaped smoothly curved surface between an outer peripheral surface of the spring rod and the end face, and a hermetically closed distal-end-center closure portion on the axis passing through the center of the spring rod. The method includes forming each of the end portions of the spring rod by forming a chamfered portion on an inner or outer peripheral side of the end portion of a hollow wire, the end portion having an opening portion at a distal end, heating the end portion of the hollow wire having the
(Continued)

chamfered portion, and spinning the heated end portion to be gathered toward the axis from the outer peripheral side by a jig. The end wall portion, which includes the distal-end-center closure portion, is formed by the distal end of the end portion being joined together on the axis.

4 Claims, 6 Drawing Sheets

(51) Int. Cl.
    *F16F 1/06*     (2006.01)
    *F16F 1/14*     (2006.01)
    *F16F 1/02*     (2006.01)
    *B60G 21/045*     (2006.01)
    *C21D 7/06*     (2006.01)
    *C21D 9/02*     (2006.01)

(52) U.S. Cl.
    CPC .................. *F16F 1/06* (2013.01); *F16F 1/14* (2013.01); *B60G 2206/012* (2013.01); *B60G 2206/427* (2013.01); *B60G 2206/724* (2013.01); *B60G 2206/81* (2013.01); *B60G 2206/8403* (2013.01); *C21D 7/06* (2013.01); *C21D 9/02* (2013.01); *F16F 2224/0208* (2013.01); *F16F 2226/02* (2013.01); *F16F 2234/02* (2013.01)

(58) Field of Classification Search
    CPC .................. B60G 21/055; B60G 11/14; B60G 2206/012; B60G 2206/8403; B60G 2206/724; B60G 2206/427; B60G 2206/81; C21D 7/06; C21D 7/13; C21D 9/02; C21D 9/08
    See application file for complete search history.

(56) References Cited

U.S. PATENT DOCUMENTS

| | | | |
|---|---|---|---|
| 2,524,420 | A | 10/1950 | Blampin |
| 4,429,899 | A | 2/1984 | Ohno et al. |
| 4,627,257 | A | 12/1986 | McElhaney |
| 4,628,704 | A | 12/1986 | Kilby |
| 5,085,131 | A | 2/1992 | Barrett et al. |
| 5,644,826 | A | 7/1997 | Reyes |
| 6,154,961 | A | 12/2000 | Park et al. |
| 7,861,706 | B2 | 1/2011 | Bellomo |
| 9,145,941 | B2 | 9/2015 | Yajima et al. |
| 9,482,302 | B2 | 11/2016 | Toyotake et al. |
| 10,105,746 | B1 | 10/2018 | Wilson et al. |
| 2007/0216126 | A1 | 9/2007 | Lopez et al. |
| 2008/0168819 | A1 | 7/2008 | Tsuda |
| 2013/0292890 | A1 | 11/2013 | Yajima et al. |
| 2014/0225319 | A1 | 8/2014 | Schüssler et al. |
| 2014/0265081 | A1 | 9/2014 | Nakano et al. |
| 2015/0176101 | A1 | 6/2015 | Ishitsuka et al. |
| 2015/0184267 | A1 | 7/2015 | Koshita et al. |
| 2019/0030973 | A1 | 1/2019 | Umezawa et al. |
| 2019/0030979 | A1 | 1/2019 | Umezawa et al. |
| 2019/0030980 | A1 | 1/2019 | Tange et al. |
| 2022/0041027 | A1* | 2/2022 | Umezawa ............... F16F 1/042 |

FOREIGN PATENT DOCUMENTS

| | | | |
|---|---|---|---|
| JP | 56158538 | U | 11/1981 |
| JP | 57020507 | U | 2/1982 |
| JP | 59011010 | U | 1/1984 |
| JP | 59160929 | U | 10/1984 |
| JP | 07012160 | A | 1/1995 |
| JP | 2004290987 | A | 10/2004 |
| JP | 2005256964 | A | 9/2005 |
| JP | 2007127227 | A | 5/2007 |
| JP | 2012117612 | A | 6/2012 |
| JP | 2013185670 | A | 9/2013 |
| JP | 2014043922 | A | 3/2014 |
| JP | 2015047978 | A | 3/2015 |
| KR | 1996-0002271 | U | 1/1996 |
| KR | 20120037586 | A | 4/2012 |
| KR | 20120037591 | A | 4/2012 |
| KR | 101459277 | B1 | 11/2014 |
| WO | 2012073786 | A1 | 6/2012 |
| WO | 2013175821 | A1 | 11/2013 |

OTHER PUBLICATIONS

Related U.S. Appl. No. 17/510,669, First Named Inventor: Masahiro Umezawa; Title: "Hollow Coil Spring and Suspension Device for Vehicle"; filed Oct. 26, 2021.
Extended European Search Report (EESR) dated Oct. 29, 2019 issued in counterpart European Application No. 17775324.1 (which is a counterpart of parent U.S. Appl. No. 16/145,037).
Extended European Search Report (EESR) dated Oct. 29, 2019 issued in European Application No. 17775323.3 (which is a counterpart of related U.S. Appl. No. 16/145,094).
International Search Report (ISR) dated Jun. 13, 2017 issued in International Application No. PCT/JP2017/013096 (which is a counterpart of related U.S. Appl. No. 16/145,094).
International Search Report (ISR) dated Jun. 20, 2017 issued in International Application No. PCT/JP2017/013098 (which is a counterpart of parent U.S. Appl. No. 16/145,037).
Korean Office Action dated Aug. 5, 2019 (and English translation thereof) issued in Korean Patent Application No. 10-2018-7027841 (which is a counterpart of parent U.S. Appl. No. 16/145,037).
Notice of Allowance dated May 20, 2020 issued in related U.S. Appl. No. 16/145,094.
Office Action (Final Rejection) dated Aug. 3, 2020, issued in parent U.S. Appl. No. 16/145,037.
Office Action (Final Rejection) dated Jul. 28, 2021 issued in related U.S. Appl. No. 16/145,094.
Office Action (Final Rejection) dated Jun. 1, 2021, issued in parent U.S. Appl. No. 16/145,037.
Office Action (Final Rejection) dated Nov. 6, 2020 issued in related U.S. Appl. No. 16/145,094.
Office Action (Non-Final Rejection) dated Feb. 12, 2020 issued in related U.S. Appl. No. 16/145,094.
Office Action (Non-Final Rejection) dated Jun. 29, 2020 issued in related U.S. Appl. No. 16/145,094.
Office Action (Non-Final Rejection) dated Mar. 18, 2020 issued in parent U.S. Appl. No. 16/145,037.
Office Action (Non-Final Rejection) dated Mar. 19, 2021, issued in related U.S. Appl. No. 16/145,094.
Office Action (Non-Final Rejection) dated Sep. 29, 2021, issued in parent U.S. Appl. No. 16/145,037.
Related U.S. Appl. No. 16/145,037; First Named Inventor: Masahiro Umezawa; Title: "Hollow Spring Member"; filed Sep. 27, 2018.
Related U.S. Appl. No. 16/145,094; First Named Inventor: Masahiro Umezawa; Title: "Hollow Coil Spring and Suspension Device for Vehicle"; filed Sep. 27, 2018.
Written Opinion dated Jun. 13, 2017 issued in International Application No. PCT/JP2017/013096 (which is a counterpart of related U.S. Appl. No. 16/145,094).
Written Opinion dated Jun. 20, 2017 issued in International Application No. PCT/JP2017/013098 (which is a counterpart of parent U.S. Appl. No. 16/145,037).

* cited by examiner

METHOD OF MANUFACTURING A HOLLOW SPRING MEMBER

CROSS-REFERENCE TO RELATED APPLICATIONS

This application is a Divisional Application of U.S. application Ser. No. 16/145,037, filed on Sep. 27, 2018, which is a Continuation Application of PCT Application No. PCT/JP2017/013098, filed Mar. 29, 2017 and based upon and claiming the benefit of priority from prior Japanese Patent Application No. 2016-068043, filed Mar. 30, 2016, the entire contents of all of which are incorporated herein by reference.

BACKGROUND OF THE INVENTION

1. Field of the Invention

The present invention relates to a hollow spring member such as a coil spring, a stabilizer, or a torsion rod, using a hollow rod as the material.

2. Description of the Related Art

A suspension for a vehicle such as a car comprises a coil spring, an upper spring seat, and a lower spring seat. The upper spring seat supports an upper end of the coil spring. The lower spring seat supports a lower end of the coil spring. The coil spring is compressed between the lower spring seat and the upper spring seat. Further, the coil spring extends and retracts in accordance with the magnitude of a load applied between the lower spring seat and the upper spring seat. In order to reduce fuel consumption of a vehicle, or enhance the driving performance, there is an increasing demand for reducing the weight of vehicles. A coil spring which constitutes the suspension is not an exception, and reducing the weight of the coil spring is an inevitable requirement.

As the means for reducing the weight of a coil spring, Patent Literature 1 (JP 2007-127227 A) describes a hollow coil spring using a hollow rod (a hollow wire) as the material. In the hollow coil spring of Patent Literature 1, an opening at a distal end of the hollow rod is closed by a cap, which is a part separate from the rod. Patent Literature 2 (JP 2012-117612 A) describes the technology of closing an opening at a distal end of a rod of a hollow coil spring by spinning. The distal end of the rod is formed to be hemispherical (in a dome shape) by the spinning.

In the hollow coil spring described in Patent Literature 1, the opening at the distal end of the rod is closed by a cap, which is a part separate from the rod. Accordingly, the cap may be deformed or come off. With the hollow coil spring of Patent Literature 2, the opening at the distal end of the rod can be closed by a terminal sealed portion without using a cap. The present inventors have produced a terminal sealed portion of the hollow spring member experimentally, and conducted quality evaluation. As a result of intensive study conducted by the present inventors, it has been found that a conventional terminal sealed portion has a problem. For example, when heat treatment such as quenching and tempering was performed for the hollow spring member, sealability of the terminal sealed portion had a problem, which is assumed to have resulted from a rapid temperature change of the rod affecting the terminal sealed portion.

BRIEF SUMMARY OF THE INVENTION

Accordingly, an object of the present invention is to provide a hollow spring member having a terminal sealed portion in which a distal end of a rod is reliably closed.

One embodiment of the present invention relates to a hollow spring member constituted of a hollow rod, and includes a terminal sealed portion at an end portion of the rod. The terminal sealed portion has a rotationally symmetric shape in which an axis passing through the center of the rod is a symmetric axis, and includes an end wall portion including an end face, a distal-end-center closure portion, and a recess formed on an inner surface of the end wall portion. The distal-end-center closure portion is formed on the axis at the center of the end wall portion. The recess has a rotationally symmetric shape in which the axis is the symmetric axis. Moreover, the recess has such a shape that a thickness of the end wall portion is reduced toward the axis, and the center of the recess is located on the axis. One embodiment of the hollow spring member is a hollow coil spring constituted of a hollow rod (wire) that is formed into a helical shape. Another embodiment of the hollow spring member is a vehicle stabilizer constituted of a hollow rod in which a torsion portion and an arm portion are formed. An example of the hollow spring member may be a torsion rod.

Spinning is performed for forming the terminal sealed portion of the present embodiment. In the spinning, a rod which has been heated is rotated about an axis of the rod. A spinning jig is made to contact an outer peripheral surface of the rod which is rotating, and the spinning jig is moved in a direction along the axis toward a distal end of the rod. Simultaneously with the above, the spinning jig is moved toward the center of the rod. By repeating the spinning more than once, a distal end opening portion of the rod is gradually spin-formed. As the distal end opening portion of the rod is finally joined together on the axis (rotation center) and is formed as an integral part, a hermetically-closed distal-end-center closure portion is formed.

According to the hollow spring member of the present invention, a thickness of the distal-end-center closure portion formed at the end wall portion of the terminal sealed portion can be made less than a thickness of a part surrounding the distal-end-center closure portion due to the recess. Accordingly, in regard to a temperature change (heating, quenching, etc.,) which occurs in heat treatment, etc., a part near the distal-end-center closure portion will have a uniform temperature most quickly. Thus, an influence of thermal stress resulting from an excessive temperature difference caused at the distal-end-center closure portion is suppressed, and sealability of the distal-end-center closure portion can be ensured.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

A hollow coil spring according to a first embodiment, and a method of manufacturing the hollow coil spring will described with reference to FIGS. 1 to 6. The hollow coil spring is an example of a hollow spring member.

Figure 1:
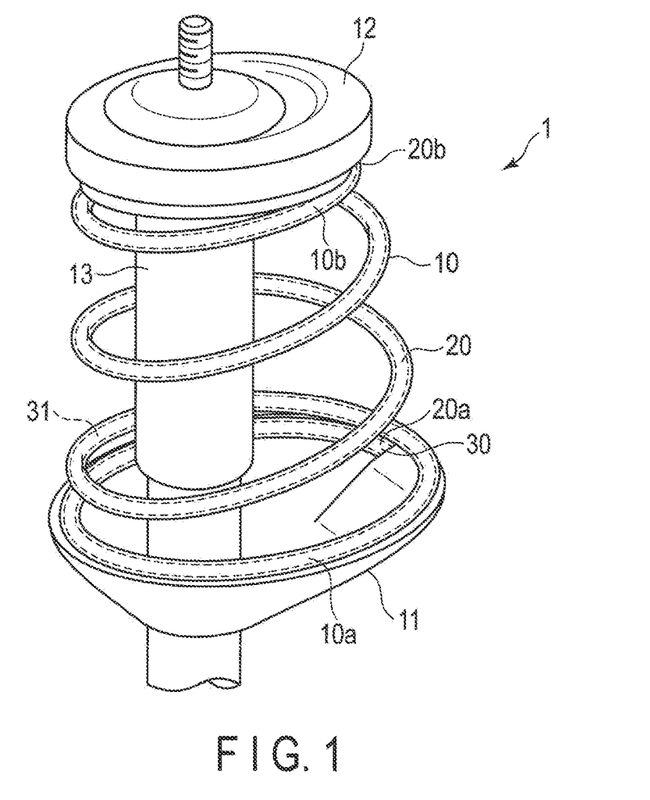
FIG. 1 is a perspective view showing a part of a vehicle suspension comprising a hollow coil spring.

FIG. 1 shows a part of a McPherson-strut-type suspension 1, as an example of a vehicle suspension. The suspension 1 of the present embodiment comprises a hollow coil spring 10, a lower spring seat 11, an upper spring seat 12, and a shock absorber 13. The lower spring seat 11 supports a lower end turn portion 10a of the hollow coil spring 10. The upper spring seat 12 supports an upper end turn portion 10b of the hollow coil spring 10. The shock absorber 13 functions as a strut. The hollow coil spring 10 may be used for a suspension other than the McPherson-strut-type suspension.

The hollow coil spring 10 shown in FIG. 1 is fitted to a vehicle body in such a state that it is compressed between the lower spring seat 11 and the upper spring seat 12 (i.e., a state in which a preload is applied). The hollow coil spring 10 elastically supports a load applied from above in the vehicle body. The hollow coil spring 10 is compressed between the spring seats 11 and 12 in accordance with the magnitude of the load. Accordingly, a distance between the spring seats 11 and 12 is varied in accordance with the load.

The hollow coil spring 10 of the present embodiment includes a hollow rod (a hollow wire) 20 that is helically formed (coiled). The hollow rod 20 is a material of the hollow coil spring 10, and is made of spring steel. The specific shape of the hollow coil spring 10 is not limited to cylindrical, and the hollow coil spring 10 may be formed variously as, for example, a barrel-shaped coil spring, an hourglass coil spring, a tapered coil spring, a variable pitch coil spring, and springs of the other shapes.

A material of the rod 20 is a steel material for a spring which can be processed by hot working (for example, in a temperature range in which steel is austenitized). Although a type of the steel material is not particularly limited, a steel material for a general suspension coil spring, for example, may be used. Apart from the spring steel, high-strength steel or steel for carburizing, for example, may be used. Alternatively, in some cases, low-carbon steel having a carbon concentration of approximately 0.15 to 0.60 wt % may be used. In other words, various steel materials can be applied.

On both ends of the hollow coil spring 10, more specifically, end portions 20a and 20b of the rod 20, terminal sealed portions 30 are formed, respectively. The terminal sealed portions 30 are formed in advance by a spinning apparatus 60 before the rod 20 is formed (coiled) helically.

Figure 2:
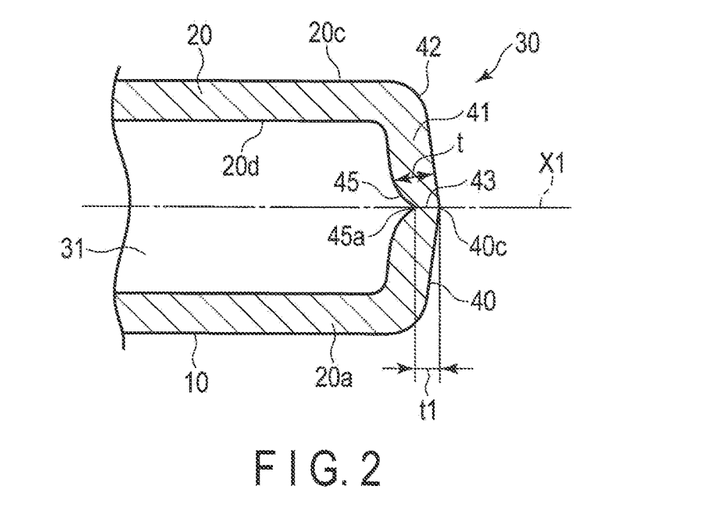
FIG. 2 is a cross-sectional view of a terminal sealed portion of a hollow coil spring according to a first embodiment.
Figure 3:
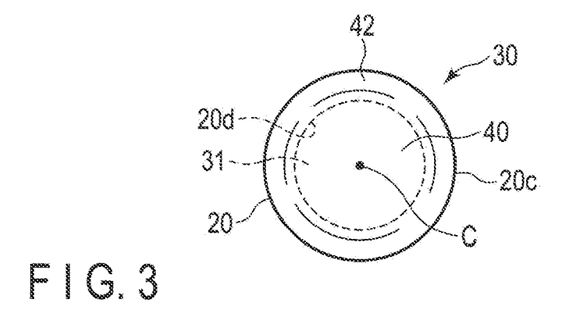
FIG. 3 is a front view of the terminal sealed portion shown in FIG. 2.

FIG. 2 shows a cross section of the terminal sealed portion 30 along an axis X1. FIG. 3 is a front view of the terminal sealed portion 30 shown in FIG. 2. A cross section obtained in a radial direction perpendicular to the axis X1 of the rod 20 is circular. As shown in FIG. 2, the terminal sealed portion 30 has a rotationally symmetric shape in which the axis X1 passing through a center C (FIG. 3) of the rod 20 is the symmetric axis. More specifically, the terminal sealed portion 30 has such a shape that its cross section along the axis X1 does not change even if the terminal sealed portion 30 is rotated by an arbitrary angle about the axis X1. The cross section along the axis X1 is intended as a cross section obtained in a longitudinal direction passing through the center C (axis X1) of the rod 20. Inside the rod 20, an enclosed space 31 is formed.

The terminal sealed portion 30 includes an end wall portion 41 including an end face 40, and an arc-shaped curved surface 42. A center 40c of the end face 40 is located on the axis X1. The end face 40 shown in FIG. 2 has such a convex shape that a portion near the center 40c is slightly projected to the outside. The end face 40 may have a flat shape substantially perpendicular to the axis X1. Alternatively, the end face 40 may have such a convex shape that the end face 40 is slightly bulged in a shape of an arc. The arc-shaped curved surface 42 is formed in a shape of an arc between an outer peripheral surface 20c of the rod 20 and the end face 40. The arc-shaped curved surface 42 connects between the outer peripheral surface 20c of the rod 20 and the end face 40 with a smooth curved surface. An inner surface 20d of the rod 20 has a rotationally symmetric shape in which the axis X1 is the symmetric axis, likewise the outer peripheral surface 20c.

As shown in FIG. 2, on the axis X1 at the center of the end wall portion 41, a distal-end-center closure portion 43 is formed. A distal end (distal end opening portion) 20e of the hollow rod 20 is converged toward the axis X1 by the spinning. As the distal end (distal end opening portion) 20e of the rod 20 subjected to spinning merges on the axis X1 to be joined together and formed as an integral part, the distal-end-center closure portion 43 is formed. On an inner surface of the end wall portion 41, a recess 45 having a rotationally symmetric shape in which the axis X1 is the symmetric axis is formed. The recess 45 has such a shape that a thickness t of the end wall portion 41 is reduced toward the axis X1. Moreover, the center of the recess 45 (i.e., a distal end 45a of the recess 45) is located on the axis X1 (symmetric axis), likewise the distal-end-center closure portion 43. At the center of the recess 45, the distal-end-center closure portion 43 is formed. A thickness t1 of the distal-end-center closure portion 43 is less than the thickness t at a part surrounding the distal-end-center closure portion 43.

Figure 4:
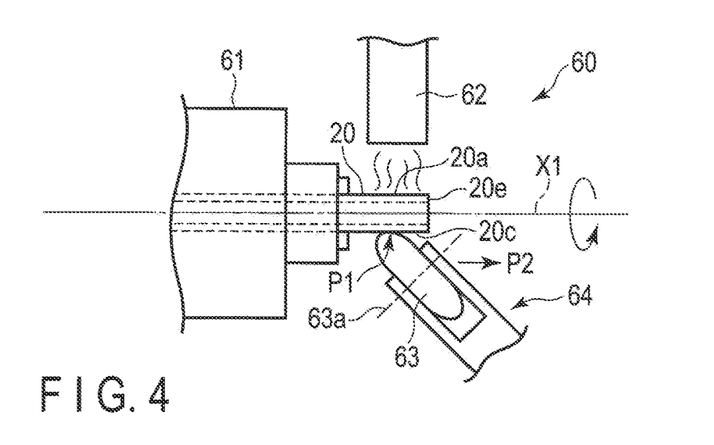
FIG. 4 is a side view schematically showing a part of a spinning apparatus.
Figure 5:
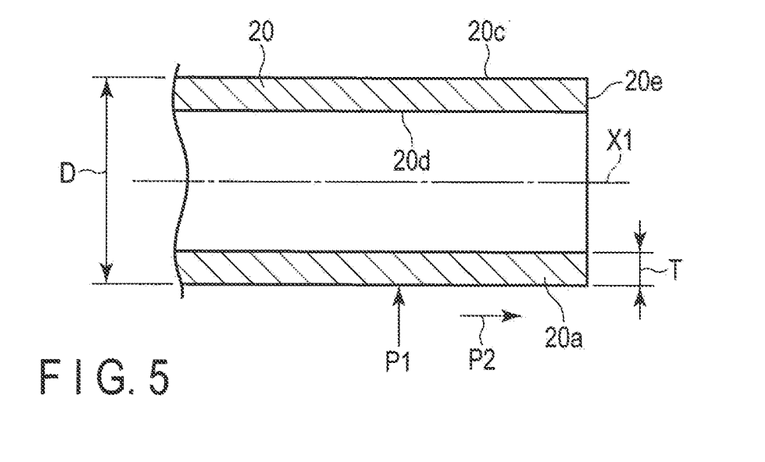
FIG. 5 is a cross-sectional view showing an example of an end portion of a hollow rod before the terminal sealed portion is formed.

FIG. 4 is a side view schematically showing a part of a spinning apparatus 60. By the spinning apparatus 60, the terminal sealed portion 30 is formed at the end portion 20a of the rod (hollow wire) 20. FIG. 5 is a cross-sectional view of the rod 20 before the terminal sealed portion 30 is formed. An example of an outside diameter D of the rod 20 is φ19 mm, and an example of a thickness T is 3 mm. The rod 20 has a rotationally symmetric shape in which the axis X1 is the symmetric axis.

The spinning apparatus 60 shown in FIG. 4 includes a lathe 61, heating means 62, and a spinning mechanism 64. The lathe 61 chucks the rod 20, and rotates the rod 20 about the axis X1. The heating means 62 heats the end portion 20a of the rod 20. The spinning mechanism 64 comprises a roller-shaped spinning jig 63. An example of the heating means 62 is a gas burner. A preferred another example of the heating means 62 is a high-frequency induction heating coil. In order to heat the end portion 20a of the rod 20, using the high-frequency induction heating coil is recommended. In a state in which the spinning jig 63 is in contact with the rod 20 that is rotating, the spinning jig 63 is driven to rotate about a rotational axis 63a.

The end portion 20a of the rod 20 is rotated by the lathe 61. The end portion 20a of the rotating rod 20 is heated to, for example, austenitizing temperature, by the heating means 62. The heated rod 20 glows red, and has softness suitable for processing. The heated rod 20 is rotated about the axis X1 by the lathe 61. A distal end of the spinning jig 63 is made to contact the outer peripheral surface 20c of the end portion 20a of the rod 20 that is heated and rotated in this way. The distal end of the spinning jig 63 is brought to contact a spinning start point P1 (FIGS. 4 and 5), which is tens of millimeters (for example, 20 mm) away from the distal end (distal end opening portion) 20e of the rod 20. Further, the spinning jig 63 is moved in a direction indicated by arrow P2 (i.e., a direction along the axis X1). Simultaneously with the above, the spinning jig 63 is moved in a radial direction of the rod 20 toward the axis X1.

By such movement of the spinning jig 63, the distal end (distal end opening portion) 20e of the rod 20 is plastically flowed such that it is gathered toward the axis X1 from the outer peripheral surface 20c. Further, the distal end (distal end opening portion) 20e of the rod 20 is spin-formed such that the diameter of the distal end (distal end opening portion) 20e of the rod 20 is gradually reduced. The above spinning is performed several times before the temperature of the rod 20 is dropped excessively. By doing so, the distal end 20e of the rod 20 subjected to spinning is joined together on the axis X1 and is formed as an integral part. As a result, the distal-end-center closure portion 43 that is sealed is formed at the end wall portion 41.

The distal-end-center closure portion 43 exists on the axis X1 at the center of the end wall portion 41. The distal-end-center closure portion 43 is hermetically closed by the spinning. Accordingly, it is possible to prevent fluid such as water, oil, and gas, from entering inside the enclosed space 31 through the distal-end-center closure portion 43, from outside the end wall portion 41.

The end face 40 and the arc-shaped curved surface 42 of the terminal sealed portion 30 are formed when the terminal sealed portion 30 is formed by the spinning apparatus 60. More specifically, the end face 40 and the arc-shaped curved surface 42 can be formed in accordance with a locus of movement of the spinning jig 63 during the spinning. Accordingly, there is no need to separately add a different step such as machining for forming the end face 40 and the arc-shaped curved surface 42. On an inner surface of the end wall portion 41, the recess 45 having a rotationally symmetric shape in which the axis X1 is the symmetric axis is formed.

The recess 45 can be formed by controlling the movement of the spinning jig 63 when the distal end 20e of the rod 20 is to be spin-formed by the spinning jig 63. The distal-end-center closure portion 43 is located on the axis X1. The thickness at the center of the end wall portion 41 (thickness t1 of the distal-end-center closure portion 43) has become smaller than the thickness at a part surrounding the center due to the recess 45 which has been formed. Accordingly, in regard to a temperature change (heating or quenching), which occurs when heat-treating the coil spring 10, a part near the distal-end-center closure portion 43 will have a uniform temperature most quickly. In other words, a temperature variation of the distal-end-center closure portion 43 becomes small, and thermal stress which is produced in the distal-end-center closure portion 43 can be reduced. As the thermal stress is suppressed, sealability of the distal-end-center closure portion 43 is ensured, and a weakness of the distal-end-center closure portion 43 can be overcome.

Figure 6:
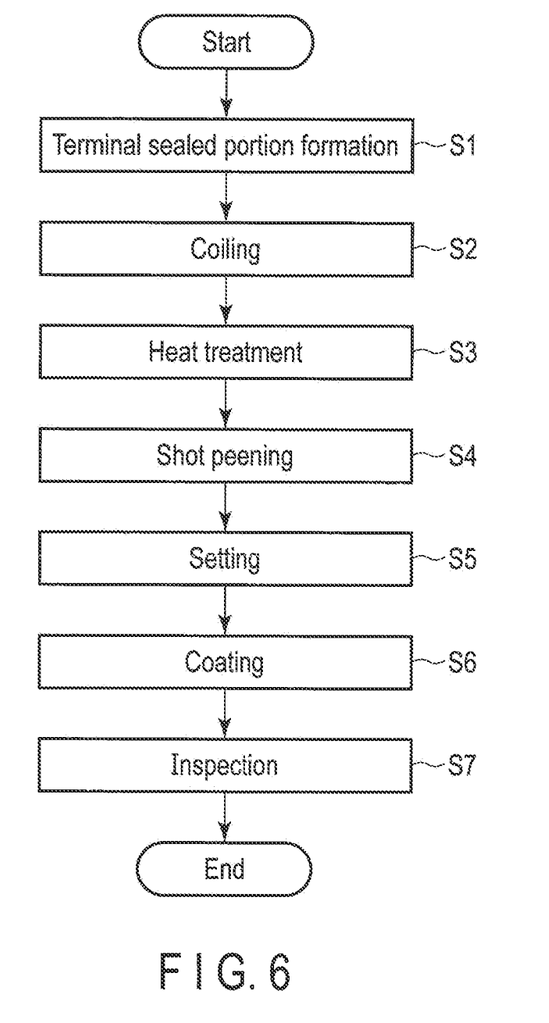
FIG. 6 is a flowchart showing an example of steps of manufacturing the hollow coil spring.

FIG. 6 shows an example of steps of manufacturing the hollow coil spring 10. In terminal sealing step S1 in FIG. 6, the terminal sealed portions 30 are formed on the end portions 20a and 20b of the rod 20, respectively. After that, in coiling step S2, the rod 20 is formed into a helical shape by a coil spring manufacturing device. An example of the coil spring manufacturing device comprises a mandrel which rotates, a rotational head portion, a chuck configured to fix a distal end of the rod onto the rotational head portion, a guide which guides the rod, and the like.

In coiling step S2, the distal end (terminal sealed portion 30) of the rod 20 is fixed to the rotational head portion by the chuck of the coil spring manufacturing device. Further, by moving the guide in an axial direction of the mandrel while the mandrel is being rotated, the rod 20 is wound around the mandrel like a coil at a predetermined pitch. More specifically, the coil spring 10 is formed helically by hot working. The formed coil spring 10 is removed from the mandrel.

In heat treatment step S3 in FIG. 6, heat treatment such as quenching and tempering is performed for the coil spring 10. By this heat treatment, a heat-treated structure of steel having hardness necessary as a spring is formed. In shot peening step S4, shot peening is performed by a shot peening machine. By the shot peening, a compressive residual stress is produced on a surface of the coil spring 10. Further, in setting step S5, setting is performed for the coil spring 10. After coating has been applied to the coil spring 10 in coating step S6, the coil spring 10 is inspected in inspection step S7, and the coil spring 10 meeting the standard is accepted as a product.

Figure 7:
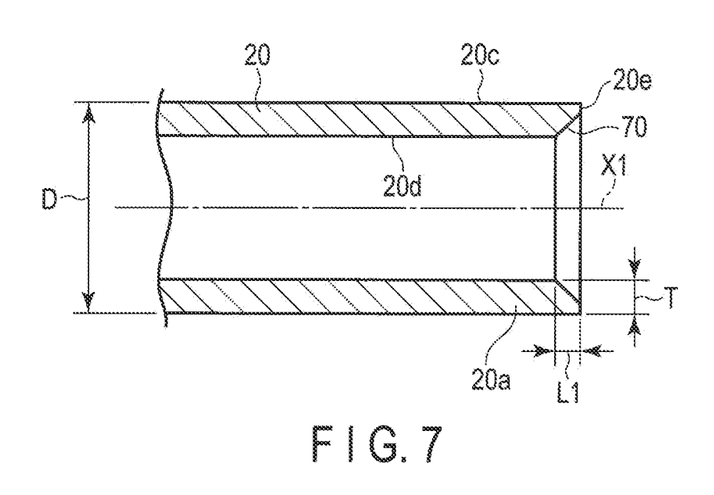
FIG. 7 is a cross-sectional view showing an example of a rod having a chamfered portion on an inner side of the end portion.

FIG. 7 shows an example in which a chamfered portion 70 is formed on an inner side of the end portion 20a of the rod 20. When the rod 20 has the outside diameter D of φ19 mm, and the thickness T of 3 mm, a length L1 of the chamfered portion 70 is set to 2 mm. The chamfered portion 70 may have a length other than the above. The terminal sealed portion 30 having the recess 45 may be formed by performing the spinning on the end portion 20a of the rod 20, which has the chamfered portion 70 on the inner side of the rod 20 as in this example, by the spinning apparatus 60 shown in FIG. 4.

Figure 8:
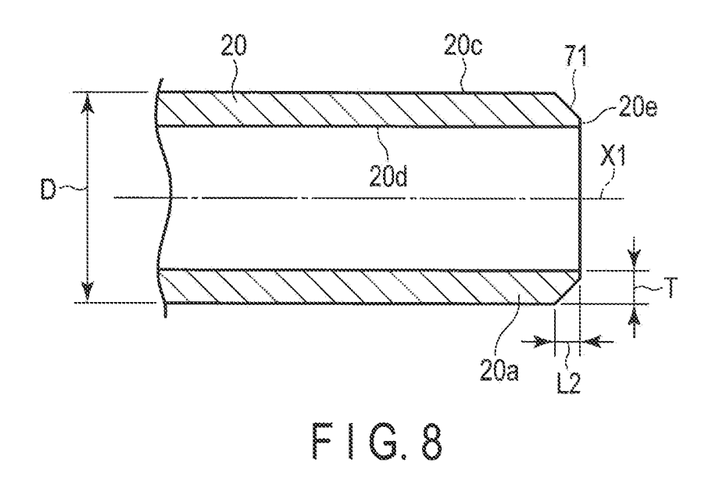
FIG. 8 is a cross-sectional view showing an example of a rod having a chamfered portion on an outer side of the end portion.

FIG. 8 shows an example in which a chamfered portion 71 is formed on an outer side of the end portion 20a of the rod 20. When the rod 20 has the outside diameter D of φ19 mm, and the thickness T of 3 mm, a length L2 of the chamfered portion 71 is set to 2 mm. The chamfered portion 71 may have a length other than the above. The terminal sealed portion 30 having the recess 45 may be formed by performing the spinning on the end portion 20a of the rod 20, which has the chamfered portion 71 on the outer side of the rod 20 as in this example, by the spinning apparatus 60 shown in FIG. 4.

Figure 9:
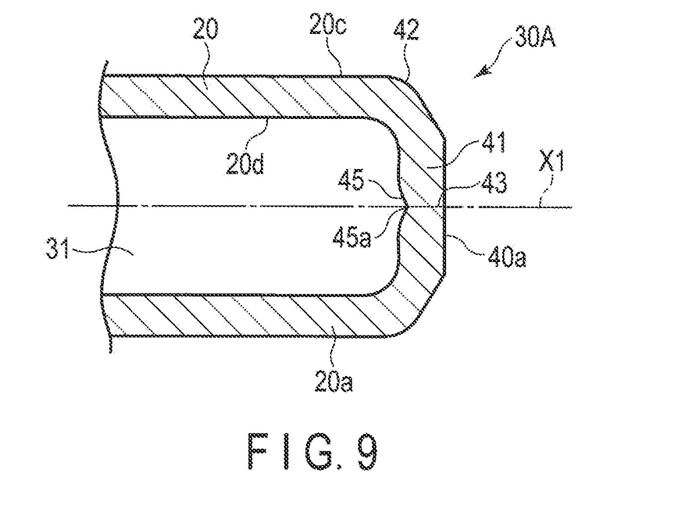
FIG. 9 is a cross-sectional view of a terminal sealed portion according to a second embodiment.

FIG. 9 shows a cross section of a terminal sealed portion 30A according to a second embodiment. The terminal sealed portion 30A also has a rotationally symmetric shape in which an axis X1 of a rod 20 is the symmetric axis, likewise the terminal sealed portion 30 of the first embodiment. More specifically, the terminal sealed portion 30A includes an end wall portion 41, an arc-shaped curved surface 42, a distal-end-center closure portion 43, and a recess 45 in a cross section along the axis X1 (symmetric axis). The end wall portion 41 includes an end face 40a, which is perpendicular to the axis X1, and is substantially flat. The arc-shaped curved surface 42 is contiguous with the end face 40a and an outer peripheral surface 20c. The distal-end-center closure portion 43 is formed on the axis X1 at the center of the end wall portion 41. The recess 45 has a rotationally symmetric shape in which the axis X1 is the symmetric axis. The center of the recess 45 (i.e., a distal end 45a of the recess 45) is located on the axis X1. The end face 40a which is substantially flat can be formed by pressing a jig having a flat pressure surface, for example, against the end wall portion 41.

Figure 10:
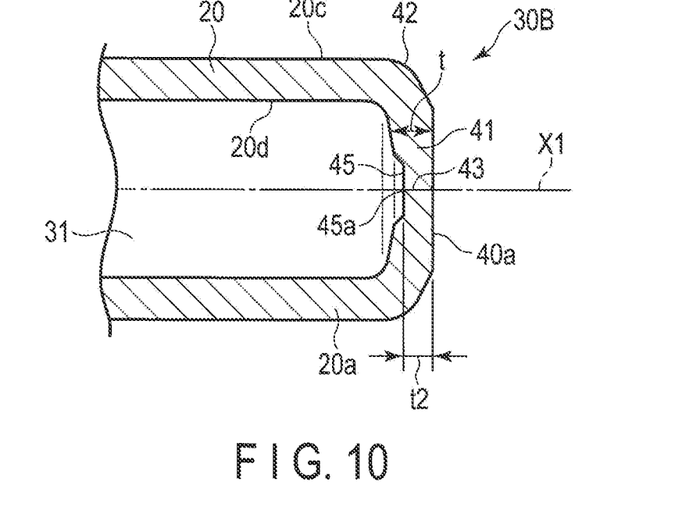
FIG. 10 is a cross-sectional view of a terminal sealed portion according to a third embodiment.

FIG. 10 shows a cross section of a terminal sealed portion 30B according to a third embodiment. The terminal sealed portion 30B also forms a rotationally symmetric shape in which an axis X1 of a rod 20 is a symmetric axis. More specifically, the terminal sealed portion 30B includes an end wall portion 41, an arc-shaped curved surface 42, a distal-end-center closure portion 43, and a recess 45 in a cross section along the axis X1 (symmetric axis). The end wall portion 41 includes an end face 40a, which is perpendicular to the axis X1, and is substantially flat. The arc-shaped curved surface 42 is contiguous with the end face 40a and an outer peripheral surface 20c. The distal-end-center closure portion 43 is formed on the axis X1 at the center of the end wall portion 41. The recess 45 has a rotationally symmetric shape in which the axis X1 is the symmetric axis. The center of the recess 45 (i.e., a distal end 45a of the recess 45) is located on the axis X1. A thickness at the center of the recess 45, more specifically, a thickness t2 of the distal-end-center closure portion 43 is less than a thickness t at a part surrounding the distal-end-center closure portion 43.

Figure 11:
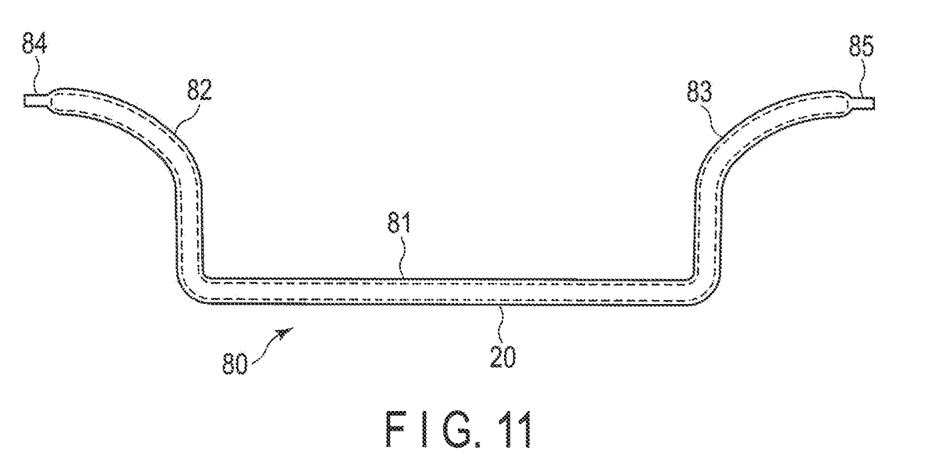
FIG. 11 is a plan view of a vehicle stabilizer according to a fourth embodiment.

FIG. 11 shows a hollow stabilizer 80 for a vehicle according to a fourth embodiment. The hollow stabilizer 80 is an example of a hollow spring member, and is arranged in a suspension mechanism part of a vehicle. The hollow stabilizer 80 is constituted of a hollow rod 20, and includes a torsion portion 81 extending in a width direction of the vehicle, arm portions 82 and 83 extending from both ends of the torsion portion 81, and mounting portions 84 and 85. Each of the mounting portions 84 and 85 is formed by processing an end portion of the hollow rod 20 having a terminal sealed portion similar to that of the above embodiments.

Figure 12:
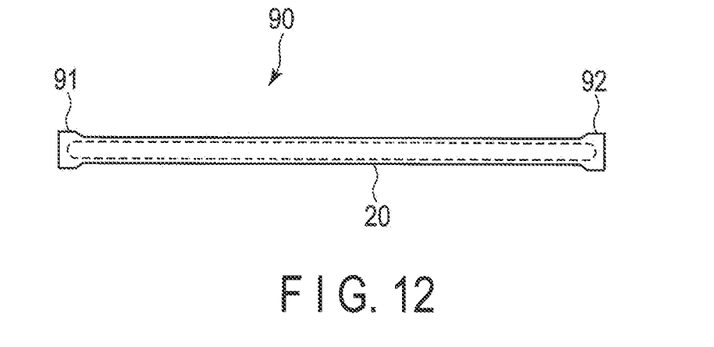
FIG. 12 is a plan view of a torsion rod according to a fifth embodiment.

FIG. 12 shows a hollow torsion rod (torsion bar) 90 according to a fifth embodiment. The hollow torsion rod 90 is an example of a hollow spring member, and a torsional load is applied to the hollow torsion rod 90. The torsion rod 90 is constituted of a hollow rod 20. Mounting portions 91 and 92 are provided on both ends of the hollow torsion rod 90. Each of the mounting portions 91 and 92 is formed by processing an end portion of the hollow rod 20 having a terminal sealed portion similar to that of the above embodiments.

The present invention is also applicable to a hollow spring member such as a stabilizer or a torsion rod constituted of a hollow rod, for example, other than the hollow coil spring. Also, various shapes may be adopted for the shape of the end wall portion and the shape of the recess of the terminal sealed portion without departing from the spirit of the invention. Further, the diameter and the type of steel of the rod (hollow wire or hollow rod), which is the material of the hollow spring member, are not limited to those described in the embodiments.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method for manufacturing a hollow spring member which comprises a hollow spring rod made of steel that includes terminal sealed portions at both end portions of the spring rod, wherein each of the terminal sealed portions has a rotationally symmetric shape in which an axis passing through a center of the spring rod is an axis of symmetry, and wherein each of the terminal sealed portions comprises: an end wall portion including an end face; an arc-shaped curved surface formed between an outer peripheral surface of the spring rod and the end face, the arc-shaped curved surface connecting the outer peripheral surface of the spring rod and the end face; a hermetically closed distal-end-center closure portion that is on the axis passing through the center of the spring rod and is at a center of the end wall portion; and a recess formed on an inner surface of the end wall portion, the recess having a rotationally symmetric shape in which the axis passing through the center of the spring rod is the axis of symmetry, a center of the recess being located on the axis passing through the center of the spring rod, the method comprising:
   forming each of the end portions of the spring rod by a process comprising:
   forming a chamfered portion on an inner peripheral side or outer peripheral side of the end portion of the spring rod, the end portion comprising an opening portion at a distal end,
   heating the end portion of the spring rod having the chamfered portion,
   spinning the heated end portion to be gathered toward the axis from the outer peripheral side by a jig, and
   forming the end wall portion including the distal-end-center closure portion by the distal end of the end portion being joined together on the axis.

2. The method of claim 1, further comprising:
   forming the spring rod into a helical shape as a coil spring.

3. The method of claim 1, further comprising:
   forming the spring rod into a vehicle stabilizer which includes a torsion portion and arm portions.

4. The method of claim 1, further comprising:
   forming the spring rod into a torsion rod which includes mounting portions on both ends.

* * * * *